United States Patent
Cho (10) Patent No.: US 9,618,030 B2
(45) Date of Patent: Apr. 11, 2017

(54) LOCK NUT

(71) Applicant: KUMSAN E&C CO., LTD., Seoul (KR)

(72) Inventor: Han-baek Cho, Seoul (KR)

(73) Assignee: KUMSAN E&C CO., LTD., Seoul (KR)

(*) Notice: Subject to any disclaimer, the term of this patent is extended or adjusted under 35 U.S.C. 154(b) by 280 days.

(21) Appl. No.: 14/370,562

(22) PCT Filed: Jan. 16, 2013

(86) PCT No.: PCT/KR2013/000322
§ 371 (c)(1),
(2) Date: Jul. 3, 2014

(87) PCT Pub. No.: WO2013/109042
PCT Pub. Date: Jul. 25, 2013

(65) Prior Publication Data
US 2015/0010373 A1    Jan. 8, 2015

(30) Foreign Application Priority Data

Jan. 20, 2012  (KR) .................. 10-2012-0006449
Dec. 10, 2012  (KR) .................. 10-2012-0142686

(51) Int. Cl.
*F16B 37/12*    (2006.01)
*F16B 39/10*    (2006.01)
(Continued)

(52) U.S. Cl.
CPC .............. *F16B 39/10* (2013.01); *F16B 39/20* (2013.01); *F16B 39/34* (2013.01); *F16B 37/12* (2013.01)

(58) Field of Classification Search
CPC .......... F16B 39/10; F16B 39/20; F16B 39/34; F16B 37/12
(Continued)

(56) References Cited

U.S. PATENT DOCUMENTS 1,830,920 A * 11/1931 Sundh ............... F16B 39/32
                                                411/262
1,929,169 A * 10/1933 Hall ................. F16B 39/32
                                                411/262
(Continued)

FOREIGN PATENT DOCUMENTS

KR    10-0701782    3/2007
KR    100701643     4/2007
(Continued)

OTHER PUBLICATIONS

International Search Report for International Application No. PCT/KR2013/000322, dated Apr. 24, 2013.

*Primary Examiner* — Gary Estremsky
(74) *Attorney, Agent, or Firm* — Kile Park Reed & Houtteman PLLC (57) ABSTRACT

The present invention is a lock nut which fastens to enable a downstream bent portion of a spiral coil spring to be a stopper point so that the diameter of the spiral coil spring is extended overall, and which unfastens to release the downstream bent portion from the stopper point and enable an upstream bent portion of the spiral coil spring to be a stopper point so that the diameter of the spiral coil spring is extended overall, thus enabling the lock nut to be easily fasten without sacrificing elastic fastening forces of the conventional lock nut, preventing the lock nut from easily unfastening by unintentional external force, and enabling the lock nut to unfasten only by intentional external force. The above described operation can be performed without increasing manufacturing cost, and the lock nut can be manufactured to be disposable in order to achieve preventing accidents in advance.

12 Claims, 7 Drawing Sheets (51) Int. Cl.
*F16B 39/20* (2006.01)
*F16B 39/34* (2006.01)

(58) Field of Classification Search
USPC .......................................................... 411/251
See application file for complete search history.

(56) References Cited

U.S. PATENT DOCUMENTS

| | | | | |
|---|---|---|---|---|
| 5,449,259 A * | 9/1995 | Clohessey | ............... | F16B 39/32 411/252 |
| 6,015,251 A * | 1/2000 | Chung | ................... | F16B 39/32 411/252 |
| 8,016,532 B2 * | 9/2011 | Park | ........................ | F16B 37/12 411/251 |
| 8,425,168 B2 * | 4/2013 | Campau | ................. | F16B 39/20 411/251 |
| 2008/0260491 A1 | 10/2008 | Soeda et al. | | |
| 2010/0266364 A1 * | 10/2010 | Campau | ................. | F16B 39/20 411/299 |

FOREIGN PATENT DOCUMENTS

KR         10-0902061       6/2009
KR    10-2011-0044425       4/2011

* cited by examiner

LOCK NUT

TECHNICAL FIELD

The present invention relates to a lock nut, and more particularly to a lock nut capable of being fastened under anti-release condition with high reliability and being released by the intended external force.

BACKGROUND ART

Usually, in order to prevent the lock nut from being released, a washer or a coil spring is inserted between the bolt and the nut. Conventional lock nut having a spiral coil spring between the bolt and the nut is disclosed in Korean patent No. 10-701782 and 10-701643. This lock nut includes a thread part on the inner surface of the upstream side of the fastening direction which is engaged with the bolt, and a non-thread part having a larger inner diameter than that of the thread part on the downstream side of the fastening direction and a spiral coil spring being touched on the inner wall of the non-thread part with an interval. In the non-thread part of the lock nut are formed an upstream step and a downstream step having a reduced diameter respectively to prevent the spiral coil spring in the non-thread part from leaving out.

On the surface of the downstream step of the lock nut facing the axial line of the bolt is formed a recess, in which the downstream bent portion extending outward at the downstream end of the coil spring is inserted and fixed, and the upstream end of the spiral coil spring is touched internally on the non-thread part, and is separated along the axial direction at the upstream step. And the spiral coil spring has the inner surface being clamped with the thread part of the bolt.

The above bolt is operated as follows. If a user inserts the bolt into the lock nut and turns it to the fastening direction, firstly the thread part of the bolt is engaged with the thread part of the nut, then the thread part of the bolt and the spiral coil spring is engaged to each other. Accordingly, the spiral coil spring is twisted forward fastening direction, and as the downstream bent portion is fixed in the recess, the spiral coil spring will be enlarged radially, then the front end of the thread part of the bolt would smoothly pass through the spiral coil spring. If the turning of bolt toward the fastening direction is stopped, the enlarged spiral coil spring is reduced radially to be fastened with the thread part of the bolt elastically. In this state, the spiral coil spring keeps fastening the thread part of the bolt elastically, so that the lock nut would not be released from the bolt by any unwanted external force.

But in case that the bolt is turned toward the release or unlocking direction for maintenance, as the downstream bent portion of the spiral coil spring is fixed in the recess, the spiral coil spring will be reduced radially, so the turning action of the nut toward the release direction becomes difficult. If the user turns the lock nut toward the release direction with high strength, the spiral coil spring would be broken down at the downstream bent portion, and the spiral coil spring without the downstream bent portion would remain in the non-thread part in spite of the turning action with high strength. As a result, the lock nut could not be released without damaging the lock nut itself.

In order to overcome the above problem, a solution may be proposed that an upstream bent portion extending radially outward is formed at the upstream end of the spiral coil spring similarly as that of the downstream end, and a slot extending radially is formed on the non-thread part facing the upstream bent portion. If the lock nut is turned toward the fastening direction as the upstream bent portion being in the slot, as the downstream bent portion of the spiral coil spring is fixed in the recess, the overall spiral coil spring would be radially reduced, and the upstream bent portion becomes deformed in the release direction along the inner surface of the non-thread part, then it will be engaged into the slot, so that the overall spiral coil spring will be radially extended. But this proposal has a problem that when the upstream bent portion is deformed along the inner surface of the non-thread part and is engaged into the slot, both ends of the spiral coil spring are fixed in the upstream bent portion and the downstream bent portion, so that, even though the upstream bent portion may be radially extended, the downstream bent portion still remains radially reduced, and it is yet difficult to release the lock nut from the bolt.

To solve this problem, another solution may be proposed that the diameter of the spiral coil spring may be enlarged only on the upstream end than the other part, so that when the lock nut is turned toward the release direction, only the upstream end of the spiral coil spring is reduced radially to prevent the thread part of the bolt from being fastened. But this solution also has a problem that, as the diameter of the upstream end of the spiral coil spring is larger than that of the other part, the other part of the spiral coil spring is separated more inwardly from the non-thread part than that of the conventional one, the size of the lock nut would be inevitably larger, which will result in the increased material cost and manufacturing cost. If the thickness of the spiral coil spring is reduced to cope with this problem, then the fastening force of the spiral coil spring against the thread part of the bolt would be reduced, so the reliable anti-release function would not be achieved.

And, if it is repeated that the spiral coil spring is enlarged and then reduced radially when the lock nut is fastened, and the spiral coil spring is enlarged and then reduced radially when the lock nut is released, the safety accident may happen when the lock nut is applied on the fastening device of the bridge, railroad, and so on.

DISCLOSURE

Technical Problem

The present invention is proposed to solve the above mentioned problems.

Technical Solution

According to an aspect of the present invention, there is provided a lock nut in which, when the lock nut is to be fastened, the downstream bent portion of a spiral coil spring becomes engagement point so that the overall spiral coil spring is radially enlarged, and when the lock nut is to be released, the engagement of the downstream bent portion is released and the upstream bent portion becomes engagement point so that the overall spiral coil spring is radially enlarged.

According to another aspect of the present invention, there is provided a lock nut in which, both ends of the spiral coil spring are positioned in the non-thread part of the lock nut in the radially enlarged state by a fixing means, and the fixing means is manually released by the user and the spiral coil spring is radially reduced and contacts the thread part of the bolt, and one end of the coil spring is fixed by the other fixing means to keep the coil spring in the radially enlarged state.

Advantageous Effects

According to the first aspect of the present invention, the elastic fastening force is not reduced and the fastening action of the nut is easy, and unwanted release by the unintended external force will not happen, and these advantages could be attained without increasing the cost, and as the lock nut is made to be disposable, the safety accident associated with the reuse of the lock nut could be prevented.

According to the second aspect of the present invention, in case that the positioning of the fastening object is not proper, or the order of fastening the bolt and nut is not correct, or foreign material is induced into the fastening object, so it is required to release the bolt and lock nut, it is possible to release the lock nut to save the resource. And the user can fasten the bolt and lock nut with only one hand, so the assembling work in the high place is easy and safe.

DESCRIPTION OF THE DRAWINGS

The above and other objects and advantages of the invention will become more apparent by describing a preferred embodiment with reference to the accompanying drawings in which.

DETAILED DESCRIPTION OF THE INVENTION

Best Mode

According to the first embodiment of the invention, there is provided a lock nut into which a bolt is engaged from an upstream end to a downstream end and in which a spiral coil spring is inserted in the nut, and on the downstream end of the spiral coil spring is formed a downstream bent portion which is bent radially outward, and the upstream end of the spiral coil spring is positioned to face the downstream bent portion radially, and the spiral coil spring is coiled so that a bolt should penetrate from the upstream end to the downstream end and could be fastened with the spiral coil spring, and the nut has a thread part on the inner surface of the upstream to be engaged with the bolt, and the nut has a non-thread part on the inner surface of the downstream, the non-thread part has an inner diameter larger than that of the thread part and houses the spiral coil spring with a gap, and the non-thread part includes an upstream step and a downstream step with the reduced diameter, and on the surface of downstream step exposed on the axial direction of the bolt is formed a recess, into which the downstream bent portion of the spiral coil spring is inserted, so that, if the external force is applied at the spiral coil spring in the release direction of the nut, the downstream bent portion should leave out from the recess by being pulled radially inward, and the upstream end of the spiral coil spring contacts against the upstream step, and a stopper extending inward radially is formed on the inner surface of the non-thread part adjacent to the upstream step, and the stopper is positioned to be separated from the upstream end of the spiral coil spring toward the release direction of the bolt.

According to the second embodiment of the invention, there is provided a lock nut into which a bolt is engaged from an upstream end to a downstream end and in which a spiral coil spring is inserted in the nut, and on the downstream end of the spiral coil spring is formed a downstream bent portion which is bent radially outward, and the upstream end of the spiral coil spring is positioned to face the downstream bent portion radially, and the spiral coil spring is coiled so that a bolt should penetrate from the upstream end to the downstream end and could be fastened with the spiral coil spring, and the nut has a thread part on the inner surface of the upstream to be engaged with the bolt, and the nut has a non-thread part on the inner surface of the downstream, the non-thread part has an inner diameter larger than that of the thread part and houses the spiral coil spring with a gap, and the non-thread part includes an upstream step and a downstream step with the reduced diameter, and on the surface of downstream step exposed on the axial direction of the bolt are formed a recess and another recess, into which the downstream bent portion of the spiral coil spring is selectively and detachably inserted, and the upstream end of the spiral coil spring elastically contacts against the upstream step, and a stopper contacting against the upstream end elastically is formed on the upstream step or the non-thread part adjacent to the upstream step, and the other recess is positioned to be separated from the one recess in the downstream of the fastening direction.

Figure 1:
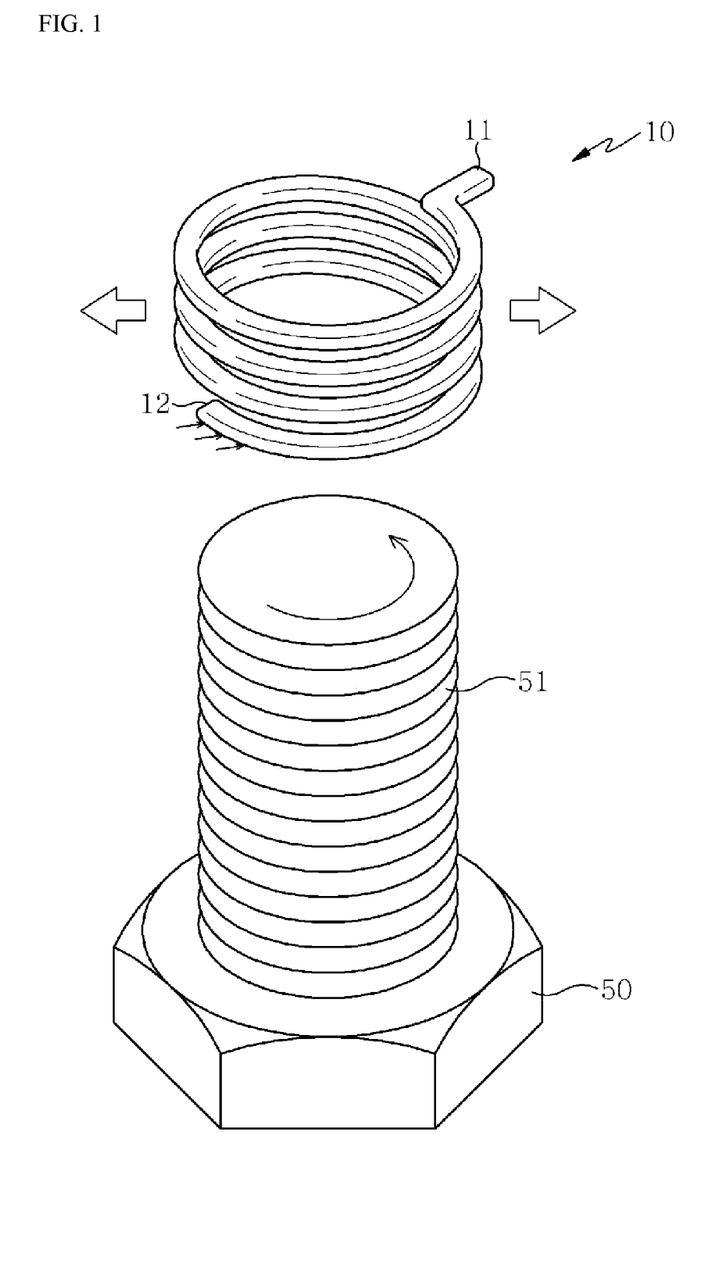
FIG. 1 is a concept view of the spiral coil spring in fastening state according to the first embodiment of the invention.

Hereinafter, the first embodiment of the invention will be described based on FIG. 1 to FIG. 4. A lock nut 100 according to the invention can be engaged with a bolt 50 from an upstream end to a downstream end and includes spiral coil spring 10 as shown in FIG. 4. On the downstream end of the spiral coil spring 10 is formed a downstream bent portion 11 which is bent outward as shown in FIG. 1. The upstream end 12 of the spiral coil spring 10 is formed on the diametrically opposite of the downstream bent portion 11. The spiral coil spring 10 is coiled so that the thread part 51 of the bolt 50 can penetrate from the upstream end 12 to the downstream end and is fastened with the spiral coil spring 10.

As shown in FIG. 4, in the state that the downstream bent portion 11 of the spiral coil spring 10 is fixedly inserted into the recess 21 of the nut 20, if a user makes the bolt 50 contact the upstream end of the spiral coil spring 10 and turns it in the fastening direction (clockwise in FIG. 1), the spiral coil spring 10 contacts the thread part of the bolt 50 frictionally and is enlarged radially and allows the bolt 50 to easily enter into the downstream end of the spiral coil spring 10.

Figure 2:
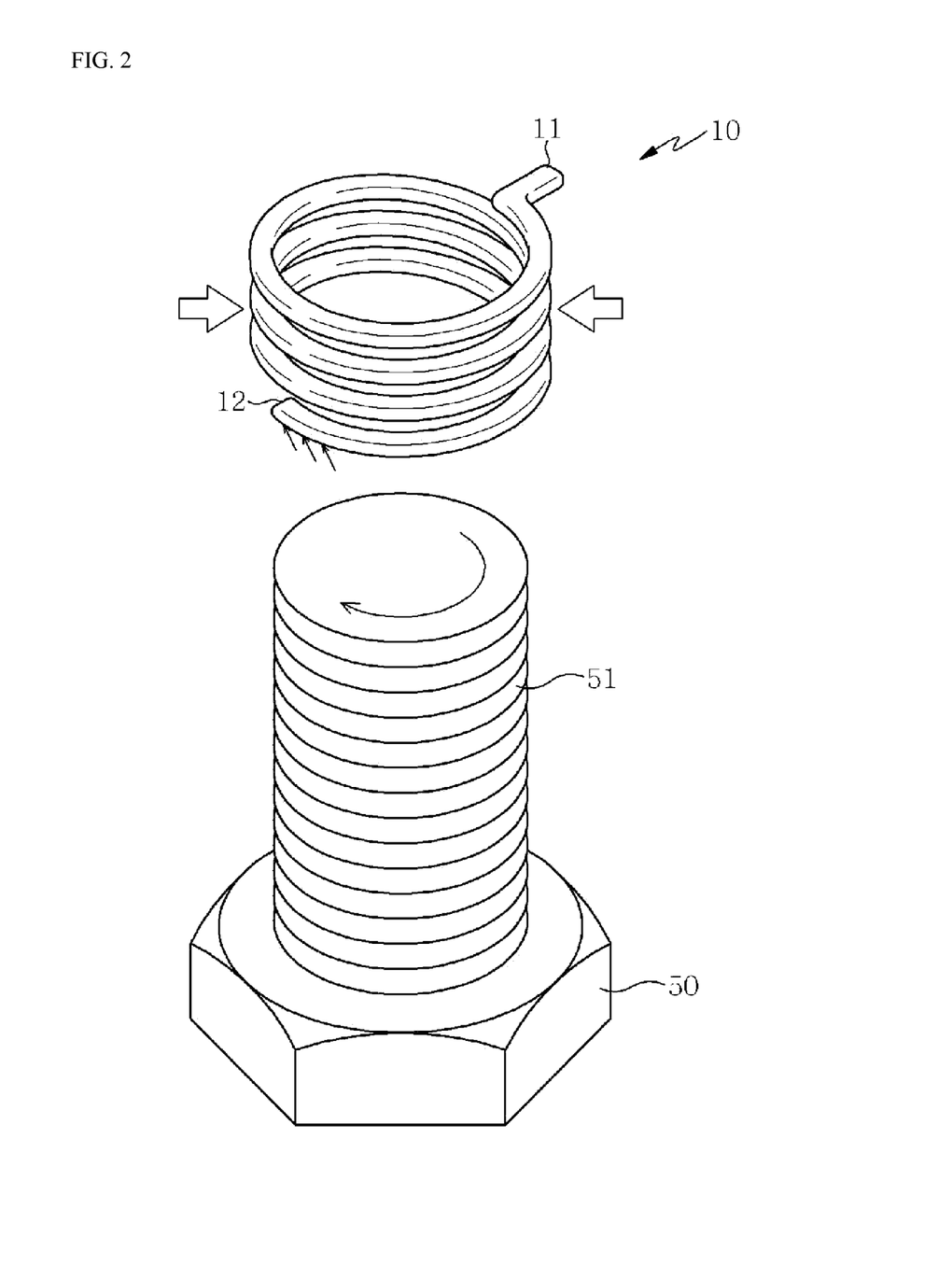
FIG. 2 is a concept view of the spiral coil spring of FIG. 1 in released state

As shown in FIG. 2, in the state that the downstream bent portion 11 of the spring 10 is fixed inserted into the recess 21 formed on the nut 20 and the bolt 50 penetrates the spring 10, if the user turns the bolt in the releasing direction (counterclockwise in FIG. 2), the spiral coil spring 10 will frictionally contact the thread part of the bolt 50 and become reduced radially, then it will prevent the bolt 50 from leaving out from the upstream of the spiral coil spring 10.

Figure 3:
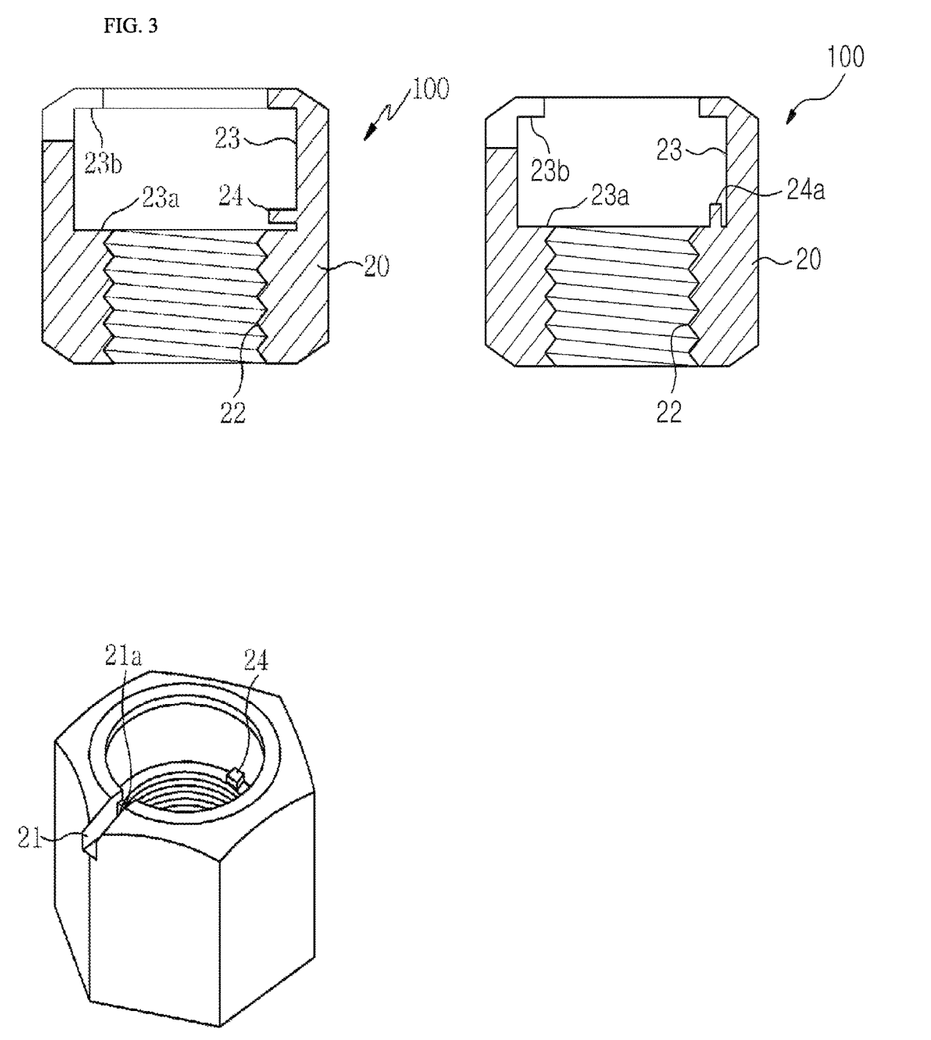
FIG. 3 is a view of the nut of the first embodiment in which the spiral coil spring is not inserted
Figure 4:
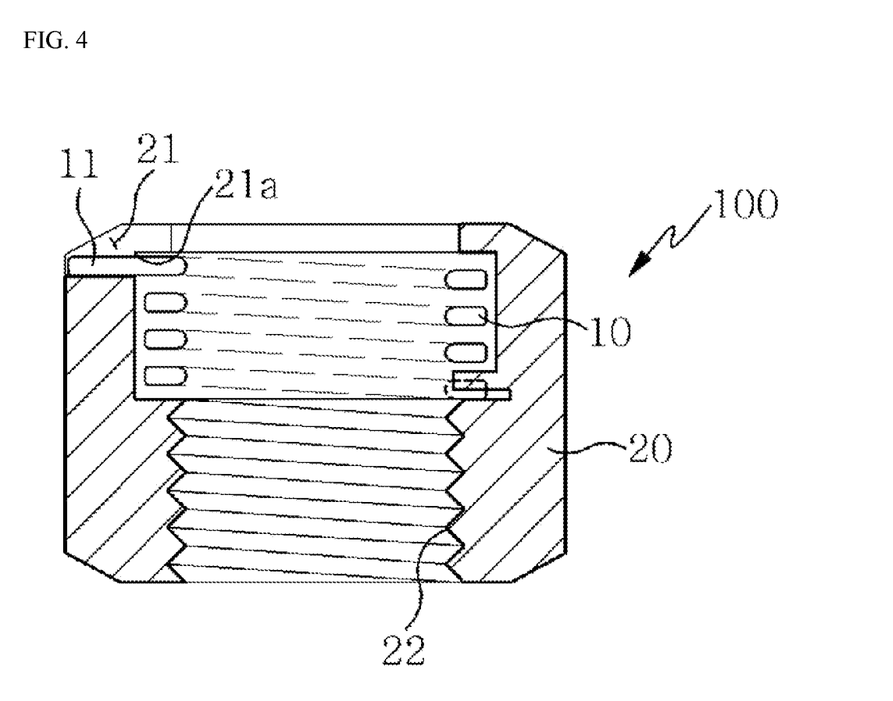
FIG. 4 is a view of the nut of the first embodiment in which the spiral coil spring is inserted

As shown in FIG. 3, the nut 20 includes a thread part 22 on the inner surface of the upstream of the fastening direction with the bolt 50, and a non-thread part 23 having a diameter larger than that of the thread part 22 and housing the spiral coil spring 10 with a gap on the downstream of the fastening direction.

The non-thread part 23 of the nut 20 includes an upstream step 23a and a downstream step 23b with the reduced diameter to prevent the spiral coil spring 10 in the non-thread part 23 from leaving out of the nut 20. On the surface of the downstream step 23b of the nut 20 is formed a radially opened recess 21. As shown in FIG. 4, the downstream bent portion 11 of the spiral coil spring 10 is engaged in the recess 21, and the upstream end 12 of the spiral coil spring 10 contacts on the upstream step 23a elastically.

As the downstream bent portion 11 of the spring 10 is engaged in the recess 21, if an external force in the release direction of the nut is applied on the spiral coil spring 10, the downstream bent portion 11 can leave out of the recess 21 by being pulled radially inward.

As shown in FIG. 3, a stopper 24 projecting radially inward is formed on the inner surface of the non-thread part 23 adjacent to the upstream step 23a. This stopper 24 is positioned to be separated with some interval from the upstream end 12 of the spiral coil spring 10 in the release direction of the bolt 50. This stopper 24 can be made by punching from outside so that one end of the stopper 24 is attached to the nut 20 and the other end of the stopper 24 projects inward.

Among the walls forming the recess 21, the edge 21a of the wall facing the inner bent portion of the downstream bent portion 11 can be formed to have acute angle so that, if an external force having a certain strength is applied, the downstream bent portion may be cut and divided from the spiral coil spring 10.

The above mentioned lock nut will function as follows. If the user inserts the thread part 51 of the bolt 50 into the thread part 22 of the lock nut 100 and turns it in the fastening direction, the thread part 51 of the bolt 50 will penetrate the thread part 22 and be fastened with the thread part 22 of the nut 20, and if the user further turns the bolt 50 in the fastening direction, the thread part 51 of the bolt 50 will frictionally contact against the upstream end 12 of the spiral coil spring 10 and press the spring 10 in the fastening direction. Then, as the downstream bent portion 11 of the spring 20 is fixedly engaged in the recess 21 of the nut 20, the spiral coil spring 10 will be enlarged radially, so the thread part 51 of the bolt will pass through the spiral coil spring 10 easily. If the user stops the turning of the bolt 50 in the fastening direction, the pressing force by the thread part 51 of the bolt 50 to the spiral coil spring 10 is released, and the spring 10 becomes reduced radially and seats in the groove of the thread part 51 of the bolt 50, then it will elastically press the thread part 51 of the bolt 50 radially inward. As a result, the clamping between the nut 20 and the bolt 50 would not be released by unintended external force.

In this state, if it is necessary to release the nut 20 from the bolt 50 for maintenance, the user should turn the nut 20 in the release direction, then the thread part 51 of the bolt 50 will frictionally contact against the spiral coil spring 10 and press the spring 10 in the release direction and make the spring 10 become radially reduced. Then if an external force with a certain strength or more in the release direction is applied on the downstream bent portion 11 of the spiral coil spring 10, the downstream bent portion 11 may leave out of the recess 21 by being pulled radially inward, or the inner bent portion of the downstream bent portion 11 is pressed intensively at the edge 21a of the recess 21 and cut from the spring 10. As a result, the upstream end 12 and the downstream bent portion 11 of the spring 10 become free ends in the fastening or release direction and become movable along the non-thread part 23 against the nut 20. In this state, if the user turns the nut 20 further in the release direction, the upstream end 12 of the spring 10 contacts the stopper 23, and the stopper 24 will press the upstream end 12 of the spring 10, so the spring 10 becomes enlarged radially, then the bolt 50 will be smoothly turned in the release direction without any restriction from the spiral coil spring 10.

The spiral coil spring 10 is disposal and could not be used again, because the downstream bent portion 11 of the spring 10 engaged in the recess 21 may be deformed or cut away if the spring 10 is to leave out of the recess 21. As a result, according to the present invention, reuse of the deformed or damaged spiral coil spring 10 is basically impossible. Therefore, the safety accident caused by the reuse of the deformed or damaged spiral coil spring 10 could be effectively prevented.

Though the stopper 24 according to the above embodiment is described to project radially inward from the inner surface of the non-thread part 23, as a modified embodiment, the stopper 24a may project from the upstream step 23a toward the downstream step 23b to achieve the same technical effect.

The second embodiment of the invention will be described based on FIG. 5 to FIG. 8. The lock nut 100 includes a spiral coil spring 10 the same with that of the first embodiment.

Figure 7:
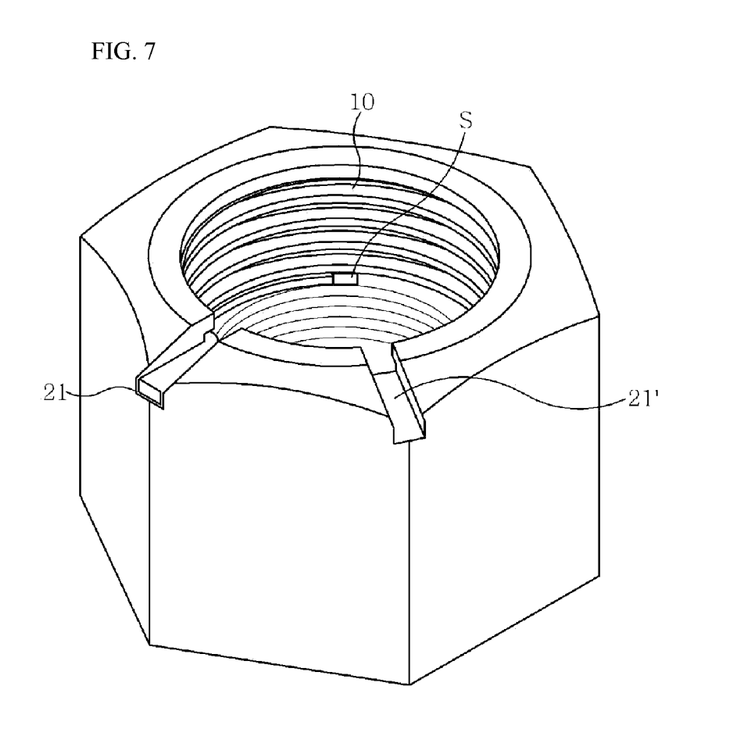
FIG. 7 is a perspective of the nut of the second embodiment in which the spiral coil spring is radially enlarged

As shown in FIG. 7, in the state that the downstream bent portion 11 of the spiral coil spring 10 is inserted into the recess 21 of the nut 20, if a user makes the bolt 50 contact the upstream end of the spiral coil spring 10 and turns it in the fastening direction (clockwise in FIG. 1), the spiral coil spring 10 contacts the thread part of the bolt 50 frictionally and is enlarged radially, so allows the bolt 50 to easily enter into the downstream end of the spiral coil spring 10.

In the state that the downstream bent portion 11 of the spring 10 is inserted into the recess 21 formed on the nut 20 and the bolt 50 penetrates the spring 10 as shown in FIG. 2, if the user turns the bolt in the release direction (counterclockwise in FIG. 2), the spiral coil spring 10 will frictionally contact the thread part 51 of the bolt 50 and become reduced radially, then it will prevent the bolt 50 from leaving out from the upstream of the spiral coil spring 10.

Figure 5:
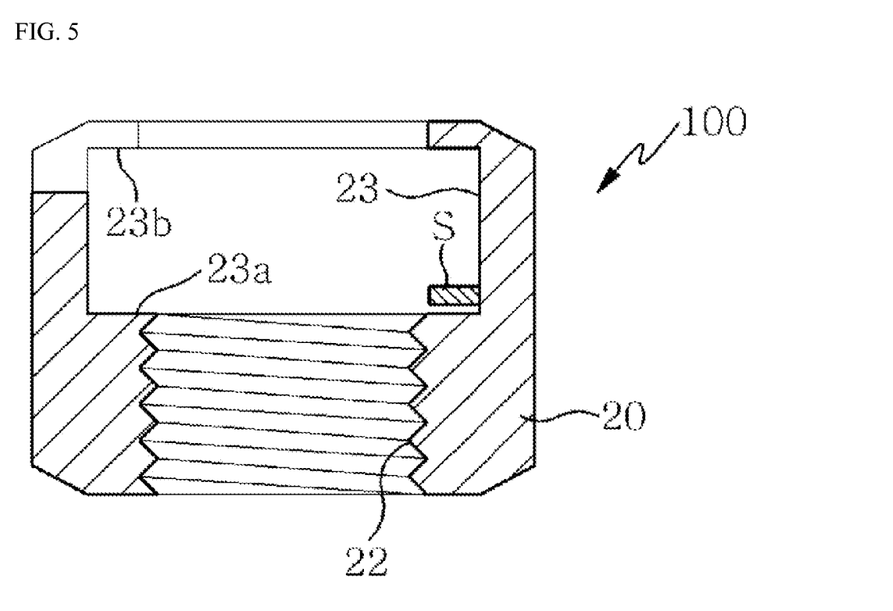
FIG. 5 is a view of the nut of the second embodiment in which the spiral coil spring is not inserted
Figure 6:
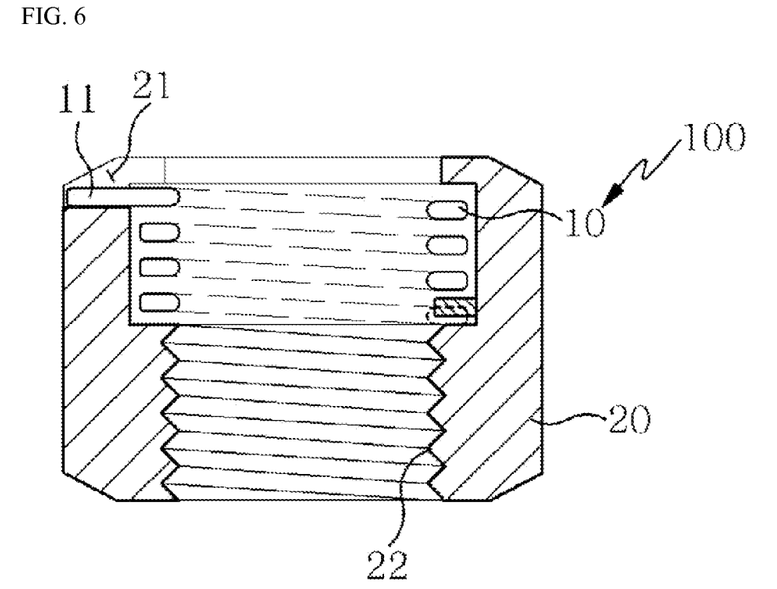
FIG. 6 is a view of the nut of the second embodiment in which the spiral coil spring is inserted

As shown in FIG. 5, the nut 20 includes a thread part 22 on the inner surface of the upstream of the fastening direction with the bolt 50, and a non-thread part 23 having a diameter larger than that of the thread part 22 and housing the spiral coil spring 10 with a gap on the downstream of the fastening direction.

Figure 8:
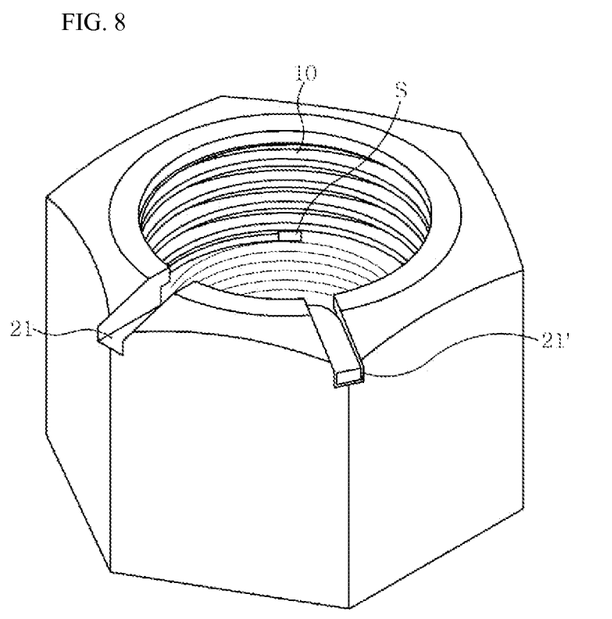
FIG. 8 is a perspective of the nut of the second embodiment in which the spiral coil spring is radially reduced

The non-thread part 23 of the nut 20 includes an upstream step 23a and a downstream step 23b with the reduced diameter to prevent the spiral coil spring 10 in the non-thread part 23 from leaving out of the nut 20. As shown in FIG. 7, on the surface of the downstream step 23b of the nut 20 are formed a recess 21 and another recess 21'. As shown in FIG. 7 and FIG. 8, the downstream bent portion 11 of the spiral coil spring 10 is selectively and detachably engaged in the recess 21 or the other recess 21', and the upstream end 12 of the spiral coil spring 10 contacts on the upstream step 23a elastically and also contacts on the stopper S formed on the non-thread part 23 elastically. The stopper S is a projection which projects from the upstream step 23a toward the downstream step 23b or it may project from the inner surface of the non-thread part 23 radially inward.

If the downstream bent portion 11 of the spiral coil spring 10 is fixed in the recess 21, and the upstream end 12 of the spiral coil spring 10 is pressed against the stopper S elastically, then the spiral coil spring 10 will be kept in radially enlarged state. Meanwhile, if the downstream bent portion 11 of the spiral coil spring 10 is fixed in the other recess 21' and the upstream end 12 of the spiral coil spring 10 is pressed against the stopper S elastically, then the spiral coil spring 10 will be kept in radially reduced state. It is based on the principle that if the upstream end of the spiral coil spring 10 is pressed clockwise (in the fastening direction) and the downstream end is pressed counterclockwise (in the release direction), then the spring 10 becomes enlarged radially, and if the upstream end of the spiral coil spring 10 is pressed counterclockwise (in the release direction) and the downstream end is pressed clockwise (in the fastening direction), then the spring 10 becomes reduced radially.

Accordingly, the recess 21 is formed on a certain point of the downstream step 23a in which the downstream end of the spiral coil spring 10 is located when the spring 10 is enlarged radially as the upstream end 12 of the spring 10 is fixed by the stopper S. Meanwhile, the other recess 21' is formed on a certain point of the downstream step 23b in which the downstream end of the spiral coil spring 10 is located when the spring 10 is reduced radially (contacting against the thread part 51 of the bolt 50, that is, the spring 10 being free without any external force) as the upstream end 12 of the spring 10 is fixed by the stopper S. That is, the other recess 21' is located in the downstream of the fastening direction against the recess 21 with some interval.

The above lock nut 100 will function as follows.

First, the spiral coil spring 10 should be positioned in the first mode (refer to FIG. 7 in which the spiral coil spring 10 is enlarged radially) in which the upstream end 12 of the spring 10 contacts the stopper S and the downstream bent portion 11 is engaged in the recess 21.

Next, the user inserts the thread part 51 of the bolt 50 into the thread part 22 of the nut 20 and turns the bolt 50 in the fastening direction, then thread part 51 of the bolt 50 passes through the thread part 22 of the nut 20 and becomes engaged with the thread part 22. If the bolt 50 is further turned in the fastening direction, the thread part 51 of the bolt will easily penetrate into the spiral coil spring 10 without any restriction by the enlarged spring 10 entrapped between the stopper S and the recess 21, and the clamping action of the lock nut 100 against the bolt 50 is completed.

In this state, if the positioning of the fastening object is not proper, or the order of fastening the bolt and nut is not correct, or foreign material is induced into the fastening object, so it is required to release the bolt and lock nut, the bolt 50 could be turned in the release direction as the ordinary bolt and nut to release the clamping between the bolt 50 and the lock nut 100.

Then bolt 50 and the lock nut 100 is fastened again, and if there is no problem in the clamping or fastening state, then the user takes out the downstream bent portion 11 of the spiral coil spring 10 from the recess 21, then as the overall spiral coil spring 10 is reduced radially, the downstream bent portion 11 is moved to the downstream of the fastening direction and positioned on the other recess 21'. Then the user inserts the moved downstream bent portion 11 into the other recess 21' to achieve the second mode (refer to FIG. 6 in which the spiral coil spring is reduced radially).

In the second mode, the spiral coil spring 10 is seated in the groove of the thread part 51 of the bolt 50 and elastically presses the thread part 51 of the bolt 50 radially inward, and the clamping between the lock nut 100 and the bolt is prevented from releasing by any unintended external force. In this state, if it is necessary to release the bolt and nut for maintenance, the user may set the spring 10 in the first mode, then the lock nut 100 can be released from the bolt 50 without any damage of the bolt and nut.

As mentioned above, in case that the positioning of the fastening object is not proper, or the order of fastening the bolt and nut is not correct, or foreign material is induced into the fastening object, so it is required to release the bolt and lock nut, it is possible to release the lock nut to save the resource. And the user can fasten the bolt and lock nut with only one hand, so the fastening work in the high place is easy and safe.

Figure 11:
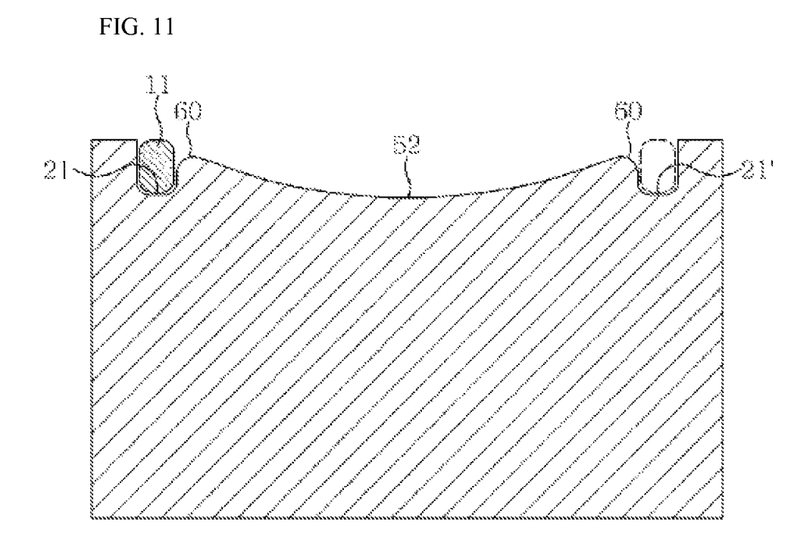
FIG. 11 is section illustrating an arch and cams are formed on the step of the downstream end of the nut of FIG. 5

FIG. 11 shows an example modified from the second embodiment, in which an arch 52 having the slowly curved recess facing the head of the bolt 50 is formed on the downstream step 23b between the recess 21 and the other recess 21'. And, a pair of cams 60 are formed on the adjacent part between the recess 21 and the arch 52 and on the adjacent part between the other recess 21' and the arch 52 respectively. These cams 60 help the downstream bent portion 11 of the spiral coil spring 10 leave out from the recess 21 or the other recess 21' to be positioned on the arch 52 when a certain amount of force is applied in the fastening or release direction. Therefore, it is possible for the user to move the downstream bent portion 11 from one recess 21 to the other recess 21' or reversely, that is, make the spiral coil spring 10 enlarged or reduced radially only by use of the fastening and releasing tool and without use of the user's hand or awl.

Figure 9:
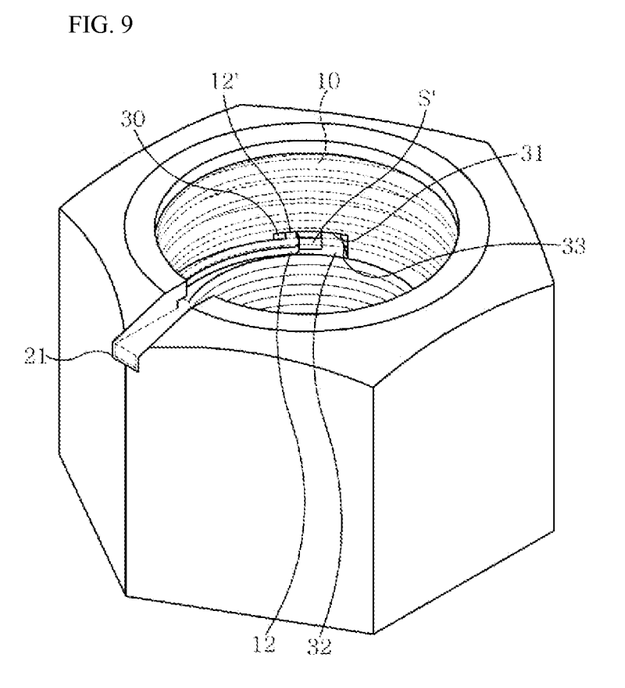
FIG. 9 is a perspective of the nut of the modified embodiment in which the spiral coil spring is radially enlarged

FIG. 9 shows another embodiment modified from the second embodiment, in which the other recess 21' among the recess 21 and the other recess 21' is removed. Instead, an elongated slot 30 is formed in the spiral direction on non-thread part 23 and adjacent to the stopper S, and the upstream end 12 of the spiral coil spring 10 is bent outward to form an upstream bent portion 12' similarly to the downstream bent portion 11 of the spiral coil spring 10, and the upstream bent portion 12' penetrates into the slot 30.

And, a stopper S' projecting toward the axial line is formed on the upper wall 31 or the lower wall 32 of the slot 30 in the axial direction, but the stopper S' is separated from the side wall 33 of the slot 30 positioned in the clockwise direction toward the counterclockwise direction, and the separated distance is set such that the spring 10 is enlarged radially when the upstream bent portion 12' is engaged in the stopper S', and the spring 10 is reduced radially when the upstream bent portion 12' rides over the stopper S' and positions between the side wall 33 and the stopper S'.

Figure 10:
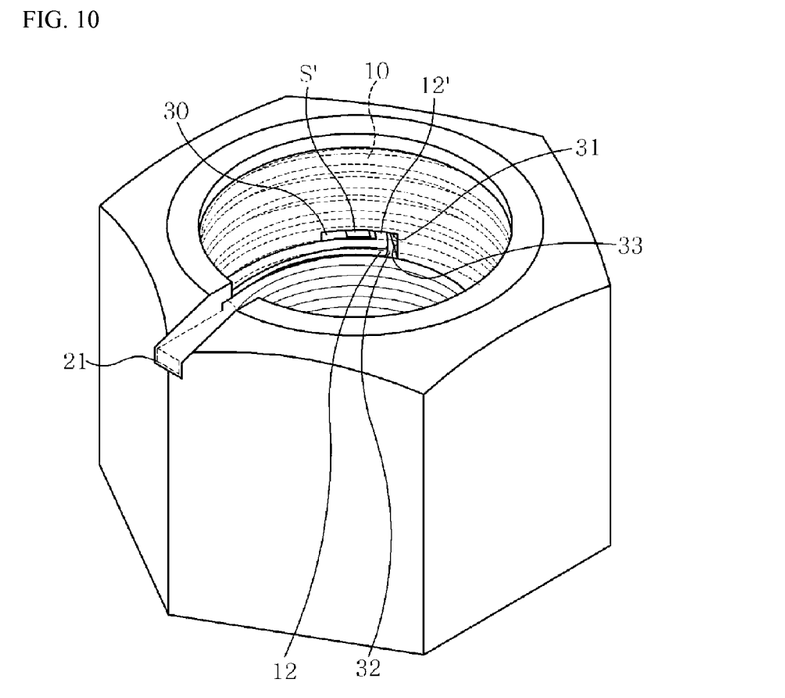
FIG. 10 is a perspective of the nut of the modified embodiment in which the spiral coil spring is radially reduced

According to the above mentioned embodiment modified from the second embodiment, the user can manually select between the first mode (the spring is enlarged radially) as shown in FIG. 9 and the second mode (the spring is reduced radially) as shown in FIG. 10. The function of this embodiment is similar to the above mentioned second embodiment and will be described as follows.

First, the spiral coil spring 10 should be positioned in the first mode (refer to FIG. 7 in which the spiral coil spring is enlarged radially) in which the upstream bent portion 12' of the spring 10 contacts the stopper S' and the downstream bent portion 11 is engaged in the recess 21.

Next, the user inserts the thread part 51 of the bolt 50 into the thread part 22 of the nut 20 and turns the bolt 50 in the fastening direction, then the thread part 51 of the bolt 50 passes through the thread part 22 of the nut 20 and becomes engaged with the thread part 22. If the bolt 50 is further turned in the fastening direction, the thread part 51 of the bolt will easily penetrate into the spiral coil spring 10 without any restriction by the enlarged spring 10 entrapped between the stop S' and the recess 21, and the clamping action of the lock nut 100 against the bolt 50 is completed.

In this state, if the positioning of the fastening object is not proper, or the order of fastening the bolt and nut is not correct, or foreign material is induced into the fastening object, so it is required to release the bolt and lock nut, the bolt 50 could be turned in the release direction as the ordinary bolt and nut to release the clamping between the bolt 50 and the lock nut 100.

Then bolt 50 and the lock nut 100 is fastened again, and if there is no problem in the clamping or fastening state, then the user takes the upstream bent portion 12' of the spiral coil spring 10 out of the stopper S' and position it between the side wall 33 and the stopper S', then the overall spiral coil spring 10 is reduced radially and the second mode is achieved.

In the second mode, the spiral coil spring 10 is seated in the groove of the thread part 51 of the bolt 50 and elastically presses the thread part 51 of the bolt 50 radially inward, and the clamping between the lock nut 100 and the bolt is prevented from releasing by any unintended external force. In this state, if it is necessary to release the bolt and nut for maintenance, the user may hold the bent portion 12' and press it toward fastening direction to be engaged in the S' and set the spring 10 in the first mode, then the lock nut 100 can be released from the bolt 50 without any damage of the bolt and nut.

INDUSTRIAL AVAILABILITY

The embodiments according to the present invention can be used in the fields of bridges, railroad, atomic power plants or power distribution board in which the mechanical safety is very important.

The invention claimed is:

1. A lock nut having a lock nut body including an internally threaded upstream end portion of the lock nut body and a non-threaded downstream end portion of the lock nut body housing a spiral coil spring positioned within the non-threaded downstream end portion of the lock nut body and into which a bolt is operable to be engaged from an upstream end of the spiral coil spring to a downstream end of the spiral coil spring, wherein the spiral coil spring is inserted in the lock nut body, and on the downstream end of the spiral coil spring a downstream bent portion is formed which is bent radially outward, and the spiral coil spring is coiled so that a bolt is operable to be screwed into the internally threaded portion of the lock nut body and through the spiral spring portion of the lock nut body from an upstream end to a downstream end of the lock nut body and a bolt is further operable to be fastened with the spiral coil spring, and the lock nut body has a threaded part on an inner surface of the upstream end of the lock nut body to be operably engaged with a bolt, and the lock nut body has a non-threaded part on an inner surface of the downstream end of the lock nut body, the non-threaded part has an inner diameter larger than that of the threaded part and houses the spiral coil spring, and the non-threaded part includes an upstream radially inwardly extending step and a downstream radially inwardly extending step with a reduced diameter, and on a downstream surface of the lock nut body is formed a radially extending recess, into which the downstream bent portion of the spiral coil spring is inserted, so that, if an external force is applied at the spiral coil spring in a counterclockwise release direction of the nut, the downstream bent portion is retained within the recess, and the upstream end of the spiral coil spring is embraced within the non-threaded part and elastically contacts against the upstream step, and a stopper extending inward radially is formed on an inner surface of the non-threaded part, and the stopper is positioned to be separated from the upstream end of the spiral coil spring to resist releasing of bolt from engagement with the lock nut.

2. The lock nut according to claim 1, wherein, an edge of a wall forming the recess and facing an inner bent portion of the downstream bent portion has an acute angle so that the downstream bent portion is adapted to be cut and divided from the spiral coil spring.

3. The lock nut according to claim 1, wherein the upstream end of the spiral coil spring is positioned diametrically opposite of the downstream bent portion.

4. A lock nut comprising a lock nut body having an internal threaded portion and an internal spiral spring portion in series into which a bolt is operable to be received from an upstream end to a downstream end of the lock nut body in which a spiral coil spring is inserted within the lock nut body, on a downstream end of the spiral coil spring a downstream bent portion is formed which is bent radially outward, and the spiral coil spring is coiled so that a bolt is operable to penetrate from the upstream end to the downstream end and is operable to be fastened with the spiral coil spring, and the lock nut body has a threaded part on an inner surface of the upstream end of the lock nut body to be engaged with the bolt, and the lock nut body has a non-threaded part on an inner surface of the downstream end of the lock nut body, the non-threaded part has an inner diameter larger than that of the threaded part and houses the spiral coil spring with a gap, and the non-threaded part includes an upstream step and a downstream step with a reduced diameter, and on the surface of the downstream step a radially open recess is formed, into which the downstream bent portion of the spiral coil spring is fixedly inserted, so that, if an external force is applied at the spiral coil spring in a release direction of the lock nut, the downstream bent portion will tend to release from the recess by being pulled radially inward and the upstream end of the spiral coil spring elastically contacts against the upstream step, and a stopper projecting from the upstream step toward the downstream step is formed on the upstream step, and the stopper is positioned to be separated from the upstream end of the spiral coil spring.

5. The lock nut according to claim 4, wherein an edge of the wall forming a recess and facing an inner bent portion of the downstream bent portion is formed with an acute angle so that, if an external force having a sufficient strength, the downstream bent portion can be cut and divided from the spiral coil spring.

6. A lock nut into which a threaded bolt is operable to be engaged from an upstream end of the lock nut to a downstream end and in which a spiral coil spring is inserted within the lock nut, wherein, on a downstream end of the spiral coil spring a downstream bent portion is formed which is bent radially outward, and the spiral coil spring is coiled so that a bolt is operable to penetrate from the upstream end to the downstream end of the lock nut and is operable to be fastened with the spiral coil spring, and the nut has a threaded part on an inner surface to be engaged with the bolt, and the lock nut has a non-threaded part on an inner surface of the downstream, the non-threaded part has an internal diameter larger than that of the threaded part and houses the spiral coil spring, and the non-threaded part includes an upstream step and a downstream step with a reduced diameter, and a first and a second radial opening recess being formed on the surface of the downstream step exposed on the axial direction of the bolt are formed a recess and another recess, into which the downstream bent portion of the spiral coil spring is selectively and detachably inserted, and the upstream end of the spiral coil spring elastically contacts against the upstream step, and a stopper contacting against the upstream end of the spiral coil spring elastically is formed on at least one of the upstream step and projecting from the upstream step toward the downstream step and the non-threaded part adjacent to the upstream step and extending inward radially, and the second recess is positioned to be peripherally separated from the first recess in the downstream of the fastening direction.

7. The lock nut according to claim 6, wherein, if the downstream bent portion of the spiral coil spring is fixed in the first recess and the upstream end of the spiral coil spring is pressed against the stopper elastically, then the spiral coil spring is maintained in radially enlarged state, and if the downstream bent portion of the spiral coil spring is fixed in the second recess and the upstream end of the spiral coil spring is pressed against the stopper elastically, then the spiral coil spring is be maintained in radially reduced state.

8. The lock nut according to claim 7, wherein an arch having a slowly curved recess facing the head of a bolt is formed on the downstream step between the first recess and the second recess, and a pair of cams are formed on the adjacent part between the first recess and the arch and on the adjacent part between the second recess and the arch respectively.

9. The lock nut according to claim 6, wherein an arch having a slowly curved recess facing the head of the bolt is formed on the downstream step between the first recess and the second recess, and a pair of cams are formed on an adjacent part between the first recess and the arch and on an adjacent part between the second recess and the arch respectively.

10. The lock nut according to claim 6, wherein an upstream end of the spiral coil spring is positioned diametrically opposite of the downstream bent portion.

11. A lock nut into which a threaded bolt is operable to be engaged from an upstream end of the lock nut to a downstream end of the lock nut in which a spiral coil spring is inserted in the lock nut, wherein on a downstream end of the spiral coil spring is formed a downstream bent portion which is bent radially outward, and the spiral coil spring is coiled so that a bolt is operable to penetrate from an upstream end to a downstream end of the lock nut and is operable to be fastened with the spiral coil spring, and the lock nut has a threaded part on an inner surface of the upstream end of the lock nut to be engaged with the bolt, and the lock nut has a non-threaded part on an inner surface of the downstream end of the lock nut, the non-threaded part has an inner diameter larger than that of the threaded part and houses the spiral coil spring with a gap, and the non-threaded part includes an upstream step and a downstream step with a reduced diameter, and on the surface of downstream step a radially open recess is formed, into which the downstream bent portion of the spiral coil spring is inserted, the upstream end of the spiral coil spring includes a bent portion being bent radially outward, an elongated slot positioned in a clockwise direction toward a counterclockwise direction is formed on the non-thread part facing the bent portion so that the bent portion can penetrate the elongated slot, and a stopper extending inward radially is formed on at least one of an upper wall and a lower wall of the elongated slot so that the bent portion is selectively engaged, and the stopper is separated from a side wall of the elongated slot.

12. The lock nut according to claim 11, wherein a separated distance from the stopper to the side wall is set such that the spiral coil spring is operable to be enlarged radially when the upstream bent portion of the spiral coil spring is engaged in the stopper, and the spiral coil spring is reduced radially when the upstream bent portion of the spiral coil spring rides over the stopper and is positioned between the side wall and the stopper.

* * * * *